United States Patent Office 3,229,471
Patented Jan. 18, 1966

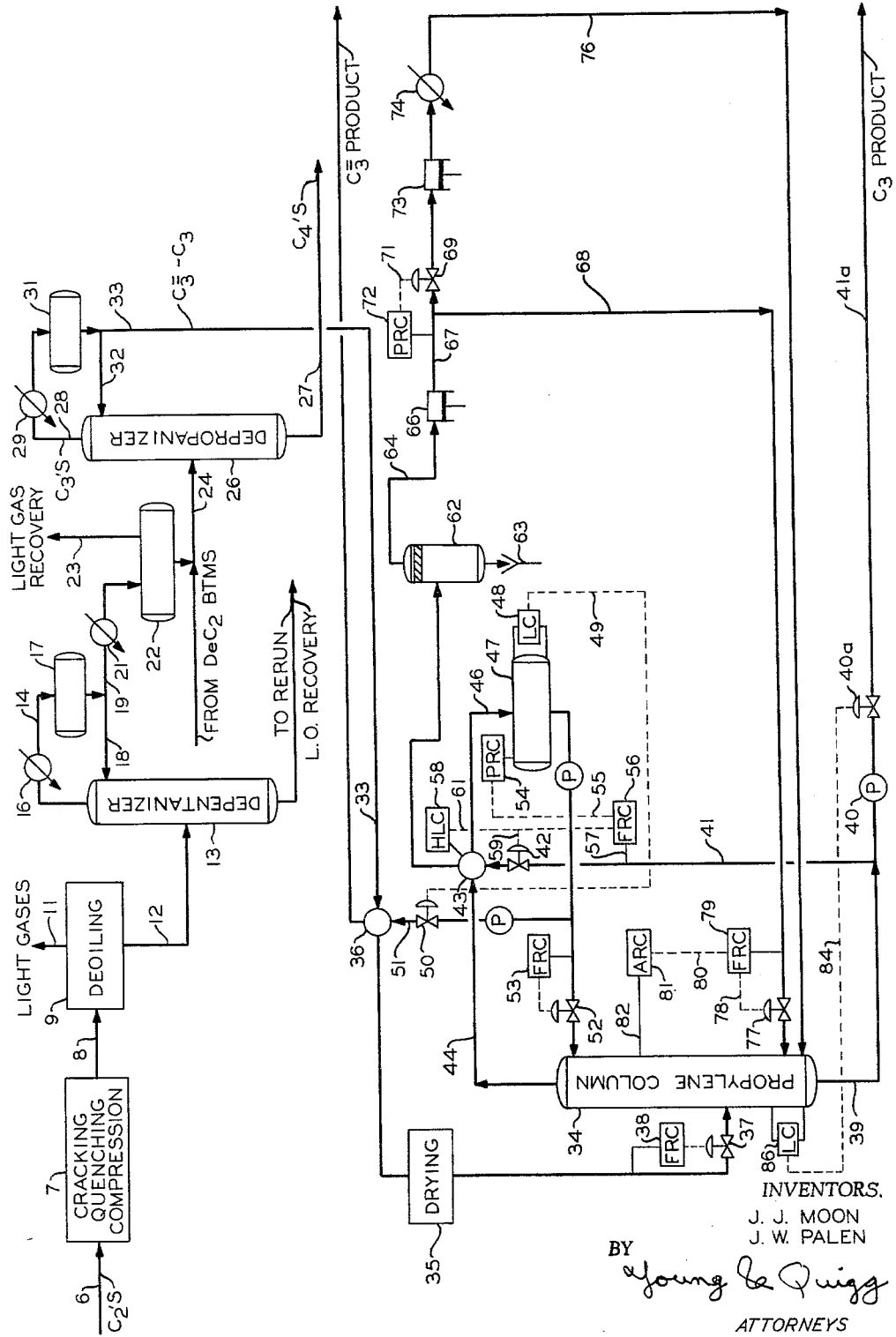

3,229,471
FRACTIONAL DISTILLATION
Joseph W. Palen and John J. Moon, Bartlesville, Okla., assignors to Phillips Petroleum Company, a corporation of Delaware
Filed Dec. 18, 1961, Ser. No. 160,066
3 Claims. (Cl. 62—21)

This invention relates to the separation of vaporizable materials by fractional distillation. In one aspect it relates to an improved method for the separation of multi-component mixtures of low-boiling normally gaseous materials by a low-temperature fractional distillation process using one of the products of the separation as the refrigerant. In still another aspect it relates to reducing the cost of the heat exchange step required to cool the internal refrigerant for recycling to the separation process.

In recent years, economies in the separation of vaporizable materials by fractional distillation in a fractionator have become of increasing importance with the rising costs of the fuels, that have, in turn, increased the cost of heat energy, usually in the form of steam used to operate such fractionation processes. One of the more successful processes in achieving these economies is disclosed in U.S. Patent 2,600,110, issued to K. H. Hachmuth on June 10, 1952. The above-mentioned process utilizes the heat removed from the overhead vapors to reboil or add heat to the kettle of the low-temperature fractionator by a heat pump system operated mechanically and supplied energy electrically. This process, in one embodiment, eliminates the reboiler for the fractionator by employing a portion of the kettle product as the heat transfer medium to carry heat from the overhead vapors to the kettle portion of the fractionation zone.

In the disclosed process, all of the vaporized kettle stream resulting from condensation of the fractionator overhead is compressed to a relatively high pressure, then must be cooled by heat exchange with cooling water, and eventually returned to the kettle portion of the fractionator. In considering applying the prior art method to propane-propylene separation, cooling of the compressed vapors by indirect heat exchange with water would require a calculated heat exchange area of about 16,000 square feet. An accepted rule of thumb for gauging the installed cost of the cooler unit is $4.50 per square foot of area. Thus, this unit alone would represent a capital investment of $64,000. The volume of cooling water which must be pumped through the calculated heat exchange area would be substantial.

We have invented an improvement in the refrigeration means taught by Hachmuth for cooling the compressed vapors, which reduces tremendously the heat exchange area required to place the heat content of the compressed kettle product vapors at a level required for controlled reboil in the fractionator. This improvement reduces the area needed to about 1650 square feet and permits a ten fold reduction in capital costs. Concomitantly, the power requirement for pumping water is similarly reduced.

According to this invention, a major portion of the compressed vapors of the kettle product refrigerant are directed, after leaving the compression step, directly back to the kettle section of the fractionator. The balance of these vapors pass on to a second compression step where their pressure is raised sufficiently to permit condensation by the available cooling water, and thus a more efficient heat transfer, in a subsequent indirect heat exchange step. This results in superior heat exchange per unit of area. The savings realized in reduced capital investment for the exchanger unit and auxiliary piping are estimated at about $175,000. Moreover, lower power costs for pumping cooling water, and reduced equipment maintenance, will further increase the economic advantage during use over the prior art method, even allowing for the cost of operating the secondary compression step.

The improved process of our invention is particularly adapted to the separation and recovery of propylene from a mixture of propylene and propane by fractional distillation. The improved process has similar utility in the separation of other olefin-paraffin mixtures, for example, ethylene-ethane and butene-butane.

It is, therefore, an object of this invention to provide an improved refrigerant cooling step in the "internal-refrigerant" fractionation method for separating a multi-component mixture of vaporizable materials.

It is another object of this invention to provide an improved internal refrigerant, low-temperature fractional distillation method for separating and recovering propylene from a mixture of propylene and propane.

A still further object is to reduce the cost of operating the necessary heat exchange step employed in partially cooling the heated internal refrigerant prior to recycling to the fractionation step.

Other objects, modifications and alterations of this invention will become apparent to those skilled in the art without departing from the scope and spirit of this invention and it should be understood that the latter is not necessarily limited to the aforementioned discussion.

Referring now to the drawing, the application of the process of our invention to the separation and recovery of propylene from a stream containing propylene and propane will now be discussed as a preferred specific embodiment. The quantities, temperatures, pressures, purities, reflux ratios, etc., referred to in the following discussion are not intended to unduly limit the scope of our invention. A $C_2$ stream, comprised predominantly of ethane, is fed through conduit 6 into zone 7, wherein thermal cracking, quenching, and compression take place. The carrying out of these steps is well known to those skilled in the art.

The quenched, compressed effluent from zone 7 is passed through conduit 8 into a deoiling zone 9. $C_2$ and lighter material, such as hydrogen and $C_1$'s are taken off overhead from zone 9 by a conduit 11. The bottoms effluent from zone 9 passes therefrom by a conduit 12 to a depentanizer 13. The bottoms stream from column 13 is passed to a rerun unit (not shown) for light oils recovery. The lighter hydrocarbons, comprising a $C_4$–$C_3$ fraction, are removed as overhead product by a conduit 14, passed through cooler 16 to hydrocarbon condensate accumulator 17. A portion of this stream is returned to depentanizer 13 by a conduit 18 as reflux, and the remainder is passed by a conduit 19 through another cooler 21, and to accumulator 22. Light gases are recovered overhead from accumulator 22 via conduit 23. The remainder of the effluent passes via conduit 24 to depropanizer 26. The bottoms product of column 26 comprising mostly $C_4$ hydrocarbons, passes to further processing via conduit 27.

The overhead product of depropanizer 26 is a hydrocarbon stream, comprising almost exclusively propylene and propane, which passes via conduit 28, through cooler 29, to accumulator 31. A portion is returned to depropanizer 26 via conduit 32, and the remainder is passed via conduit 33 to fractionating column 34. Conduit 33 has a cooler 36 and a motor valve 37 disposed therein. Intermediate cooler 36 and valve 37 is a drying zone 35, provided with a suitable dessicant, such as alumina beds, for removing moisture from overhead stream 33, to preclude the formation of hydrocarbon hydrates. Valve 37 is controlled by flow recorder controller 38.

The $C_3$ feed is introduced into column 34. A portion of the kettle product of column 34, leaves via conduit 39.

Disposed in conduit 39 are a pump 40, and a motor valve 40a. A portion of the liquid kettle product serves as an internal refrigerant, being withdrawn from conduit 39 through line 41 and is passed through a motor valve 42 and heat exchanger 43, wherein it is heated and vaporized by indirect heat exchange with the overhead product of column 34. Stream 41a is predominantly propane which is passed to recovery, or for further cracking.

Overhead vapors from fractionator 34 are passed into overhead condenser 43 through line 44, where they are cooled and condensed by indirect heat exchange with the internal refrigerant stream 41. Overhead condensate is withdrawn from condenser 43 and passed back to fractionator 34 through conduit 46 and is used as liquid reflux. Disposed in conduit 46 is a hydrocarbon condensate accumulator 47, operated at about 94 p.s.i.a. and 40° F. A level controller 48 communicating with accumulator 47 is operatively connected by an instrument air line 49 to a motor valve 50 disposed in conduit 51. Stream 51 is drawn from reflux conduit 46, and passes out of the process. A motor valve 52 is operatively controlled by a flow recorder controller 53, both located in conduit 46 downstream of conduit 51. A pressure recorder controller 54 is in communication with accumulator 47 and is operatively connected via line 55 to flow recorder controller 56, which is in communication with conduit 41 via line 57. Flow controller 56 is operatively connected to motor valve 42 and high level controller 58, via lines 59 and 61, respectively.

The vaporized internal refrigerant, which may contain a small amount of impurities or liquid, is then passed to a separator 62, such as a knockout drum, provided with a valved outlet conduit 63. Vapors are withdrawn from separator 62 through conduit 64, and are compressed in compressor 66. The compressed vapors pass from compressor 66 via conduit 67.

A major portion of stream 67 is withdrawn via conduit 68, and returned directly into the kettle portion of fractionator 34, wherein the compresed vapors directly contact the kettle product. Thus, vapor stream 68 provides the required reboil vapor for fractionator 34.

The remainder of stream 67 passes through motor valve 69, which is operatively connected via line 71 to pressure recorder controller 72, through a second compressor 73, wherein the stream is further compressed.

These compressed vapors are preferably condensed in cooler 74 by indirect heat exchange with cooling water, but of course, any cooling medium may be employed. The condensate is then passed via conduit 76 directly into the kettle portion of fractionator 34, preferably directly contacting the kettle product.

Refrigerant return conduit 68 has a motor valve 77 disposed therein, which is operatively connected via line 78 to a flow recorder controller 79. Controller 79 is also operatively connected via line 80 to analyzer recorder controller 81, which in turn communicates with a particular tray, such as number 80 of 100 trays in the upper portion of column 34, via conduit 82. Analyzer 81, such as an infrared, mass, or ultraviolet spectrometer, a chromatographic analyzer, or other suitable analyzer, which is sensitive to paraffins, such as propane, in a sample taken from the vapor at a point between the feed and the reflux line of the fractionator 34 is employed in the following manner. The sample is passed to the analyzer via conduit 82. Analyzer 81 can conveniently be a recording controller analyzer, and can be adapted to control the volume of reboiler liquid passed via conduit 68 to the kettle portion of 34. Controller 81 performs this operation by passing a signal to flow recorder controller 79 which adjusts motor valve 77. For example, if the propane concentration in the vapor sample goes up, indicating excess reboiling is occurring in the kettle portion, the flow of stream 68 is cut back to reduce the heat input and restore the desired concentration of the high boiling fraction in the overhead vapor of the column.

Regarding $C_3$ products stream 41a, a motor valve 40a is provided therein which is operatively connected via line 84 with a level controller 86 communicating with the lower portion of fractionator 34.

In carrying out the improved process of our invention using propane kettle product as the internal-refrigerant, we prefer the propane-propylene stream to fractionator 34 contain at least 25 percent propylene. We prefer to operate fractionator 34 under a pressure of from 50 to 125 pounds per square inch absolute (p.s.i.a.) and under a liquid reflux of from 1.15 to 1.3 times the minimum reflux. We find that it is advisable in operating the fractional distillation process to have no more than 10 percent propylene in the kettle product being used as the internal refrigerant.

Following is an example of our invention. The quantities, temperatures, pressures, purities, reflux ratios, etc., are not to be deemed to unduly limit the scope of our invention. Reference is made to the diagrammatic flow sheet showing the separation of a propane-propylene stream which will be described in further detail, starting with fractionator 34.

A propane-propylene stream having the following composition, and at a temperature of 110° F. and under a pressure of 100 p.s.i.g. is passed through the feed cooler 36 via conduit 33 at a rate of 555 mols per hour:

| Feed: | Mols/hr. |
|---|---|
| Ethane | 2 |
| Propylene | 361 |
| Propane | 192 |
| Total | 555 |

By indirect heat exchange with the overhead product from fractionator 34, the feed stream is cooled to about 77° F., and is introduced into the fractionator at about the fortieth tray. Flow recorder controller 38 is preset so as to admit feed to column 34, via valve 37, at a controlled rate. Fractionator 34 operates under a pressure of 95 p.s.i.a. with a top temperature of 43° F., and a bottom temperature of 49° F. Fractionator 34 has a nine-foot diameter and 100 dual flow trays.

Withdrawn through conduit 38 are 3802 mols/hr. of liquid kettle product. Stream 39 which is composed of $C_3$ hydrocarbons, mostly propane, is split into two streams. The larger stream passes through conduit 41, to serve as the internal refrigerant, and passes to cooler 43. Stream 41 comprises 3620 mols/hr., of which 354 are propylene, and 3266 are propane. A side stream 41a is withdrawn as propane product comprising 182 mols/hr., of which 18 are propylene, and 164 are propane.

Thus, 3620 mols/hr. of liquid kettle product is passed thru overhead condenser 43 to condense the overhead vapors, this being the volume rate required in the internal-refrigeration cycle. After removal of any liquid in separator 62, the kettle product at a temperature of about 20° F. and a pressure of 55 p.s.i.a. is compressed in primary compressor 66 to a temperature of about 70° F. and a pressure of 100 p.s.i.a. The compressed stream is then split with the largest portion of about 3167 mols/hr. being returned directly back to the kettle portion of fractionator 34, where the stream directly contacts the kettle product and furnishes stripping section vapors in fractionator 34. The remainder of the kettle product passes via line 76 at a rate of 453 mols/hr. to a secondary compressor 73, wherein it is further compressed to a temperature of about 135° F. and a pressure of about 220 p.s.i.a. Stream 76 is cooled in the refrigeration system down to about 105° F., and is then passed back to the kettle portion of column 34.

The rate of liquid reflux into column 34 is 3170 mols/hr. Additionally overhead propylene product gas is withdrawn from reflux line 46 via line 51 at a rate of 373 mols/hr., and passes through heat-exchanger 36, wherein it is heated from 40° F. to 90° F. in cooling the column feed passing through line 33. This propylene product stream has the following composition:

| Propylene product stream: | Mols/hr. |
|---|---|
| Ethane | 2 |
| Propylene | 343 |
| Propane | 28 |
| Total | 373 |

Although the foregoing illustrative example has been set forth with regard to an overhead stream from fractionator 34 of about 90 percent olefin purity, the improved process is equally useful in the production of a much higher purity olefin stream ranging as high as 99 plus percent of low boiling fraction, where employing a fractionator capable of making the required degree of separation.

As will be evident to those skilled in the art, various modifications of this invention can be made, or followed, in the light of the foregoing disclosure and discussion.

We claim:

1. An internal-refrigerant low-temperature fractional distillation method for separating a multi-component mixture of vaporizable material into a low-boiling fraction and a high-boiling fraction, which comprises: passing said mixture into a fractionation zone; withdrawing from the kettle portion of said fractionation zone, a liquid stream as the high-boiling fraction of said mixture; passing at least a first portion of said stream into indirect heat-exchange relationship with overhead vapors of said fractionation zone to condense at least a portion of said overhead vapors and to vaporize at least a portion of the first portion; utilizing a portion of the resulting condensed overhead product as refluxing liquid in said fractionation zone; withdrawing the balance of said condensed overhead product as the low-boiling fraction of said mixture; compressing the vaporized portion of said liquid stream; passing a major portion of said compressed stream back into said kettle portion of said fractionation zone to transfer heat from said compressed stream to said kettle product; compressing further the minor portion of said stream; cooling said minor portion; passing said cooled minor portion back into said kettle portion of said fractionation zone; regulating the passage of said first portion of said liquid stream to said heat exchange relationship in response to the pressure of said condensed overhead product; and regulating the flow rate of said major portion of said compressed stream in response to the concentration of the high-boiling fraction in said fractionation zone at a selected point of analysis.

2. An internal-refrigerant low-temperature fractional distillation method for separating a multi-component mixture of vaporizable material into a low-boiling fraction and a high-boiling fraction, which comprises: passing said mixture into a fractionation zone; withdrawing from the kettle portion of said fractionation zone, a liquid stream as the high boiling fraction of said mixture; passing at least a first portion of said stream into indirect heat-exchange relationship with overhead vapors of said fractionation zone to condense at least a portion of said overhead vapors and to vaporize at least a portion of the first portion; utilizing a portion of the resulting condensed overhead product as refluxing liquid in said fractionation zone; withdrawing the balance of said condensed overhead product as the low-boiling fraction of said mixture; compressing the vaporized portion of said liquid stream; passing a major portion of said compressed stream back into said kettle portion of said fractionation zone to transfer heat from said compressed stream to said kettle product; compressing further the minor portion of said stream; cooling said minor portion; passing said cooled minor portion back into said kettle portion of said fractionation zone; measuring the pressure of vapor associated with said condensed overhead vapors; comparing said measured pressure with a desired pressure to product a first signal proportional to the differences in said pressures; measuring the flow rate of said first portion of said liquid stream; comparing said flow rate with said first signal to produce a second signal proportional to the difference in said flow rate and said first signal; manipulating the flow rate of said first portion of said liquid stream in response to said second signal; measuring the liquid level of said first portion of said liquid stream in said heat-exchange relationship; when said level exceeds a predetermined height, overriding said second signal to manipulate said flow rate to prevent flooding of said heat-exchange relationship; measuring the concentration of the high boiling fraction in said fractionation zone at a selected point and producing a third signal representing a desired flow rate of said major portion of said compressed stream; measuring a second flow rate of said major portion of said compressed stream; comparing said desired flow rate and said second flow rate to produce a fourth signal proportional to the difference in said flow rates; and manipulating the flow rate of said major portion of said compressed stream in response to said fourth signal.

3. Fractional distillation apparatus comprising: a fractionation column; first heat exchange means; first conduit means for conducting the overhead vapors of said column to said first heat exchange means; second conduit means for conducting the kettle product of said column therefrom; third conduit means communicating between said second conduit means and said first heat exchange means for conducting at least a portion of said kettle product into indirect heat exchange relationship with said overhead vapors; an accumulator; fourth conduit means for conducting the resulting cooled overhead vapors from said first heat exchange means to said accumulator; fifth conduit means for conducting condensed overhead vapors back to the upper portion of said column as reflux; sixth conduit means connecting with said fifth conduit means for drawing off a portion of the reflux as overhead product of said apparatus; a first compressor; seventh conduit means for conducting the resulting heated kettle product from said first heat exchange means to said first compressor; eighth conduit means communicating between said first compressor and the kettle portion of said column for returning a major portion of the resulting compressed stream thereto; a second compressor; ninth conduit means communicating between said eighth conduit means and said second compressor for further compressing the remaining minor portion of said compressed stream; a second heat exchange means; tenth conduit means communicating between said second compressor and said second heat exchange means for cooling said minor portion; eleventh conduit means communicating between said second heat exchange means and said kettle portion for returning the cooled minor portion to the latter; an analyzer recorder controller; twelfth conduit means communicating between a selected point in said fractionation column and said analyser recorder controller for passing a sample thereto; a first flow recorder controller; thirteenth conduit means communicating between said first flow recorder controller and eighth conduit means for measuring the flow rate of said eighth conduit means; fourteenth conduit means communicating between said analyser recorder controller and said first flow recorder controller for passing a first signal thereto; a first valve in said eighth conduit means; fifteenth conduit means communicating between said first flow recorder controller and said first valve for manipulating said first valve; a pressure recorder controller, sixteenth conduit means communicating between said pressure recorder controller and said accumulator for measuring the pressure therein; a second flow recorder controller; seventeenth conduit means communicating between said second flow recorder controller and said third conduit means for measuring the flow therein; eighteenth conduit means communicating between said pressure recorder controller and said second flow recorder controller for passing a second signal thereto; a second valve in said third conduit means; nineteenth conduit means communicating between said second flow recorder controller and said second valve for manipulating said second valve; a high level controller; twentieth conduit means communicating between said high level controller and said first heat exchange means for measuring the level of liquid therein; and twenty-first conduit means communicating between said high level controller and said second valve for manipulating said second valve as an override of the manipulation of said second valve by said second flow recorder controller.

References Cited by the Examiner

UNITED STATES PATENTS

| | | | |
|---|---|---|---|
| 1,073,843 | 9/1913 | Blau | 62—30 XR |
| 2,534,274 | 12/1950 | Kniel | 62—28 XR |
| 2,600,110 | 6/1952 | Hachmuth | 62—27 |
| 2,619,814 | 12/1952 | Kniel | 62—28 XR |
| 2,692,484 | 10/1954 | Etienne | 62—31 XR |
| 2,835,116 | 5/1958 | Miller | 62—37 XR |
| 2,994,646 | 8/1961 | Kleiss | 202—160 |
| 2,995,544 | 8/1961 | Bourgeois | 202—160 XR |

NORMAN YUDKOFF, *Primary Examiner.*

ROBERT A. O'LEARY, *Examiner.*